Jan. 19, 1960     E. GLINGENER     2,921,504
DEBURRING DEVICE
Filed Aug. 10, 1955
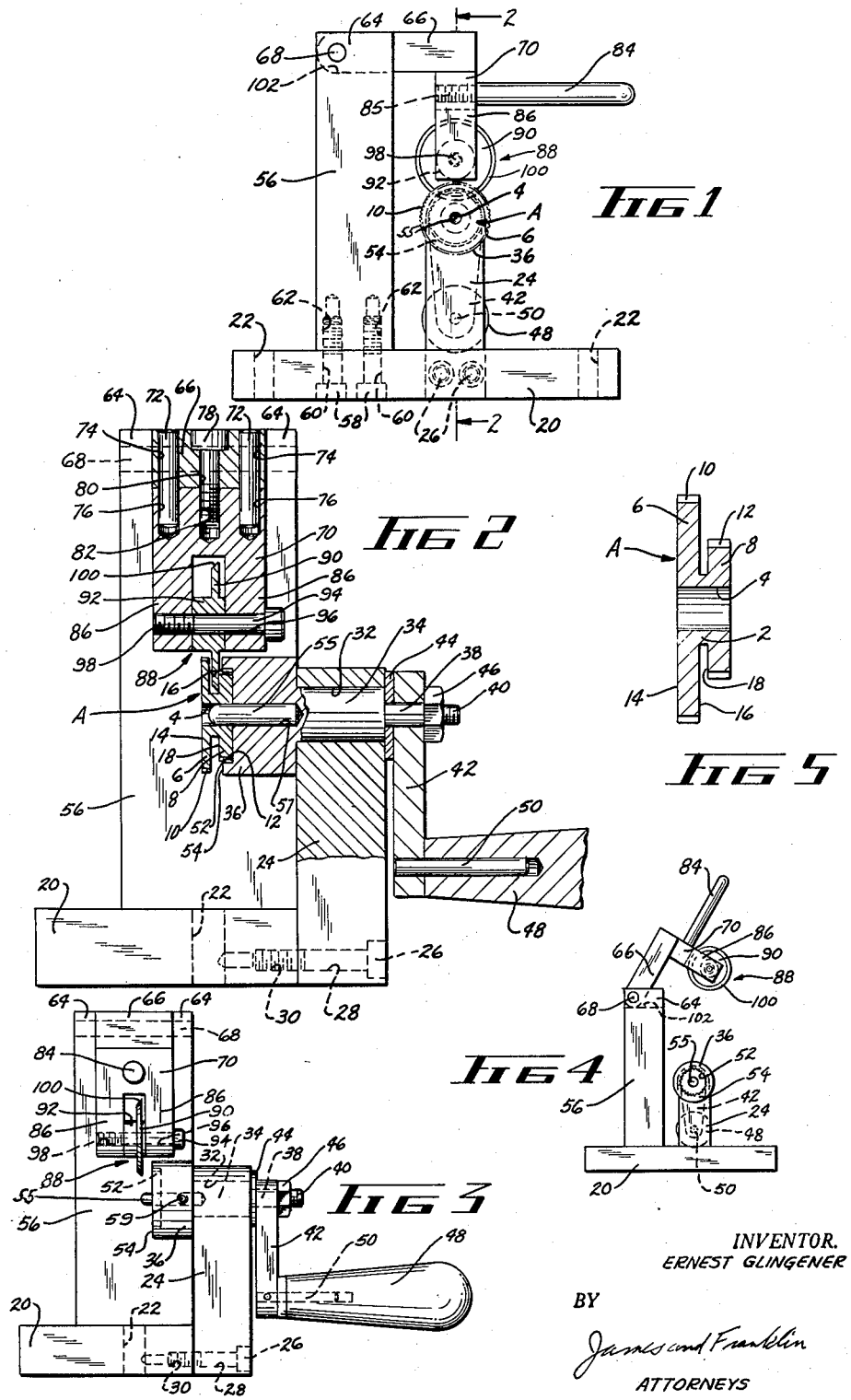
INVENTOR.
ERNEST GLINGENER
BY
*James and Franklin*
ATTORNEYS United States Patent Office 2,921,504
Patented Jan. 19, 1960

2,921,504

DEBURRING DEVICE

Ernest Glingener, Norwood, Mass., assignor to National Pneumatic Co., Inc., Boston, Mass., a corporation of Delaware Application August 10, 1955, Serial No. 527,553

5 Claims. (Cl. 90—1.4)

The present invention relates to a simple and inexpensive fixture by means of which burrs may be removed from gears or other machined elements. The invention is particularly applicable for use in connection with the removal of burrs formed in the cutting of teeth in a gear wheel.

When gear teeth are cut, burrs are usually formed on that face of the gear blank toward which the cutting tool moves. These burrs must be removed from the gear before the gear is used. Otherwise the burrs would become detached from the gear while in use and be caught up between relatively moving parts so as to score, scratch or otherwise damage those parts. A few burrs loose in a housing containing a precision gear train can make that gear train virtually useless in a short period of time.

Ordinarily the surfaces of the gear blank from which the burrs project are exposed and the burrs may be removed therefrom in conventional manner. Sometimes, however, the gear surfaces from which the burrs project are not thus exposed, and in such situations burr removal represents a problem of great importance. For example, when a pair of spur gears of different diameter are to be mounted coaxially, it is customary to form the gears individually and then secure them to one another. Since the gears are individually formed, the burred surfaces are exposed and the burrs may be removed before the two gears are assembled. The act of assembly of the two gears represents a substantial factor in the overall cost of the unit. Accordingly, it is proposed to form the two gears from a single integral blank. The burred surface of the larger of the two gears is exposed, and consequently burr removal presents no particular problem. However, the burred surface of the smaller of the two gears is not exposed. Conventional means and methods are entirely ineffectual in removing these burrs.

The integral manufacture of the two gears represents a considerable saving in production cost, and the gear unit itself is structurally superior to the composite form which was conventional, yet the problem of burr removal was so serious that it appeared that the development would have to be abandoned. All suggestions of highly qualified personnel with respect to the solution of the deburring problem were either ineffectual or impractical because of excessive cost or because of an excessive amount of time was involved.

However, I have devised a very simple and inexpensive fixture by means of which the burrs may be rapidly, conveniently and effectively removed even from the normally inaccessible surfaces of an integrally formed two-gear unit. The fixture itself costs but a few dollars, it takes up little or no space, and will function to remove burrs from such gears as rapidly or more rapidly as the gears can be produced. Burr removal is as effective and complete as with any prior procedure or apparatus.

My fixture provides means for mounting and rotating the element to be deburred, and it further includes a burr-removing member in the form of a knife which is adapted to be moved into engagement with the burred surface. Rotation of the burred element while the knife is in engagement therewith results in a complete removal of the burrs therefrom. The burr-removing member is movable from its operative position engaging the burred element to an inoperative position remote therefrom, so that a deburred element may be removed from the mounting means and a new element to be deburred may be placed thereon. In its preferred form the burr-removing member is rotatably mounted, so that as the element to be deburred is rotated, as by means of a hand crank or any other suitable power source, the burr-removing member will also rotate, thus resulting in a more rapid and accurate removal of burrs than would otherwise occur.

To the accomplishment of the above, and to such other objects as may hereinafter appear, the present invention relates to a deburring device as defined in the appended claims and as described in this specification, taken together with the accompanying drawings, in which:

Fig. 1 is a front elevational view of the device of the present invention, with the burr-removing member in operative position engaging the element to be deburred;

Fig. 2 is a cross sectional view thereof taken along the line 2—2 of Fig. 1;

Fig. 3 is a side elevational view taken from the right hand side of Fig. 1 and with the element to be deburred omitted;

Fig. 4 is a view similar to Fig. 1 but on a reduced scale and with the element to be deburred omitted, showing the burr-removing member in its inoperative position; and Fig. 5 is a cross sectional view on an enlarged scale of the integral two-gear unit with respect to which the present invention is particularly useful.

My invention, while it has general applicability, is here shown in a form specifically designed to perform a deburring operation on one gear of an integral two-gear unit. That gear unit is shown in Fig. 5 and is generally designated A. It comprises a single hub 2 having a shaft receiving aperture 4, on which hub two spur gears 6 and 8 are integrally formed, the gear 6 having a greater diameter than the gear 8. These gears have teeth 10 and 12 respectively formed on the outer periphery thereof. The formation of the gear teeth 10 is performed conventionally. The travel of the cutting blade may be from right to left as viewed in Fig. 5, so that burrs will be formed on the left hand exposed surface 14 of the gear unit A, and those burrs may be removed in conventional manner. Even if the cutting blade should travel in the opposite direction, from left to right as viewed in Fig. 5, the burrs then being formed on the surface 16, that surface is still exposed because of the reduced diameter of the gear 8 relative to the gear 6, and those burrs may also be removed conventionally. To form the gear teeth 12, however, a shaper is employed the cutting blade of which can move only in one direction, from right to left as viewed in Fig. 5. The burrs will therefore be formed on the surface 18 which faces toward and is spaced slightly from the surface 16. It is for the removal of the burrs on the surface 18 that the device of the present invention is exceedingly well adapted.

The deburring device or fixture of my invention comprises a base 20 having apertures 22 formed therein through which bolts or other securing elements may be passed so as to fasten the base 20 to a table or the like. A standard 24 is secured to one side of the base 20 by means of screws 26 passing through apertures 28 at the bottom of the standard 24 and received within internally threaded apertures 30 in the base 20. An aperture 32 is formed in the upper part of the standard 24, and shaft 34 is journaled therein, that shaft having an enlarged head 36 extending to the left of the standard 24 as viewed in Fig. 2 and having a reduced portion 38 extending to the right therefrom, the tip 40 thereof being threaded. A crank arm 42 is mounted on the shaft portion 38 so as to rotate therewith, a washer 44 preferably being interposed between the arm 42 and the standard 24, and a nut 46 is threaded over the tip 40 so as to fix the arm 42 to the shaft portion 38. A crank handle 48 is rotatably mounted on pin 50 which extends from the end of the arm 42. Rotation of the crank 42, 48 will therefore cause rotation of the shaft 34 and of its enlarged head 36.

The left hand end of the head 36 is provided with a recess 52 which has internal gear teeth formed therein. The diameter of the recess 52 and the design of the internal gear teeth thereon is such that the small diameter gear 8 of the gear unit A is adapted to fit therein with the gear teeth 12 meshing with the internal gear teeth in the recess 52. The depth of the recess 52 is preferably somewhat less than the thickness of the gear 8, so that, as may best be seen from Fig. 2, the surface 18 of the gear 8 extends somewhat to the left beyond the end surface 54 of the head 36. A pin 55 is held within axial recess 57 in the head 36 by means of set screw 59, the pin 55 projecting into the recess 52, the shaft receiving aperture 4 of the gear unit A fitting over the pin 55.

A second standard 56 extends up from the base 20 and is secured thereto by screws 58 passing through apertures 60 in the base 20 and received within internally threaded apertures 62 at the bottom of the standard 56. The upper end of the standard 56 is forked at 64, and an arm 66 is pivotally mounted between the forked portions 64 by means of rod 68. A second arm 70 depends from the end of the arm 66, being joined thereto by means of dowel pins 72 received within appropriate apertures 74 and 76 in the arms 66 and 70 respectively. A screw 78 may be employed to hold the arms 66 and 70 together, that screw passing through aperture 80 in the arm 66 and being threadedly received within aperture 82 in the arm 70. A handle 84 is received within aperture 85 in the arm 70 and projects out therefrom so as to facilitate manipulation of the arms 66, 70.

The lower end of the arm 70 is forked, at 86, and the burr-removing member, generally designated 88, is mounted between the forked parts 86. As here specifically disclosed the burr-removing member 88 comprises a knife having a circular blade 90 mounted on hub 92, the hub in turn being journaled on pin 94 so as to be freely rotatable thereabout. The pin 94 passes through aperture 96 in one of the forked portions 86 and is threadedly received in aperture 98 in the other forked portion 86. The edge of the blade 90 is provided with a bevelled cutting surface 100 the large diameter edge of which is directed toward the end surface 54 of the enlarged shaft head 36.

When the arms 66, 70 are lifted to their inoperative position shown in Fig. 4 they carry the burr-removing member 88 therewith so as to expose the end surface 54 of the enlarged shaft head 36 and the recess 52 in that head. When the arms 66, 70 are moved to their operative position shown in Figs. 1–3, being located in that position by engagement of the arm 66 with the floor surface 102 on the standard 56 between and at the bottom of the forked portions 64, the blade 90 partially overlies the recess 52 in the enlarged shaft head 36 and is slightly spaced laterally therefrom. The blade 90 is adapted to be received within the space between the surfaces 16 and 18 of the gear unit A when that unit is in place in the recess 52, the right hand surface of the blade 90 as viewed in Fig. 2 fitting closely against the surface 18 of the gear unit A and extending down below the bottoms of the gear teeth 12.

With the gear unit A mounted in the enlarged shaft head 36 and with the burr-removing member 88 in its operative position, as shown in Figs. 1 and 2, the burrs will be removed from the surface 18 of the gear unit A merely by rotating the crank 42, 48 a few times, or in any other way causing rotation of the enlarged shaft head 36. Rotation of the shaft head 36 will cause rotation of the gear unit A and thus will cause the surface 18 at the bottom of the gear teeth 12 to be drawn across the sharp knife edge of the blade 90. That knife edge will sever the burrs from the gear unit A. Since the burr-removing member 88 is rotatably mounted on the pin 94, rotation of the gear unit A with which the blade 90 is engaged will cause a corresponding rotation of the blade 90, thus giving rise to a more effective cutting of the burrs from the surface 18. After the gear unit A has been thus rotated a plurality of times the arms 66, 70 and the burr-removing member 88 are lifted to their inoperative position, the gear unit A is removed from the device, and a new gear unit A is inserted in the device, after which the sequence of operations is repeated. The burrs removed from the gear unit A are sufficiently loosely lodged in the space between the surfaces 16 and 18 thereof so that they may readily be removed by means of a blast of air or the like.

The entire sequence of operations for a given gear unit A takes but a few seconds. Hence the deburring operation can be performed considerably more rapidly than the gear units A can be fabricated, and consequently the deburring operation does not constitute a bottleneck in the production of the assemblies in which the gear units are to be employed.

It will be clear from the above description that the device of the present invention is simple, inexpensive, and quite reliable in operation. The burr-removing member 88 may readily be removed for replacement or sharpening merely by unscrewing the pin 94. When gear units A of different sizes are to be deburred, it is only necessary to utilize a different shaft head 36. In the form here specifically illustrated, that may be done by unscrewing the nut 46, removing the shaft unit 34, 36, 38, 40, and replacing it with another unit, having a head 36 of appropriate size. Alternatively, the head 36 could be detachably secured to the shaft 34 in any appropriate manner, as by having a portion of the shaft 34 project into the head 36, there to be engaged by a set screw or the like, in which case only the head 36, and not the entire shaft unit, would have to be changed.

While but a single embodiment of the present invention has been here disclosed and while the invention has been specifically described in connection with the deburring of a gear unit of special construction, it will be apparent that the invention has more general applicability, and that many variations may be made in the specific details thereof, all within the scope of the invention as defined in the appended claims.

I claim:

1. A gear deburring device comprising a base, a first standard extending up therefrom, a part mounted for rotation thereon and adapted to support and rotate an element to be deburred, means for rotating said part, a second standard extending up from said base, an arm mounted thereon so as to be pivotable about an axis substantially parallel to the axis of rotation of said part, and a burr-removing knife carried by said arm and rotatable about an axis substantially parallel to the axis of rotation of said part, said knife being movable between an inoperative position remote from said part and an operative position closer to said part and engaging the side of said element, and means independent of said burr-removing knife for rotating said part, said burr-removing knife being adapted to be rotated by engagement with said element.

2. A gear deburring device comprising a base, a part mounted for rotation thereon and adapted to support and rotate an element to be deburred, an arm articulately mounted on said base and carrying a burr-removing knife, said member being movable between an inoperative position remote from said part and an operative position closer to said part and engaging the side of said element, said burr-removing knife being rotatably mounted on said arm, and means for rotating one of said part and knife, the other of said part and knife being rotated by reason of said part-element interengagement.

3. The deburring device of claim 2, in which said burr-removing knife is rotatable about an axis substantially parallel to the axis of rotation of said element to be deburred.

4. A gear deburring device comprising a base, a part mounted for rotation thereon and adapted to support and rotate an element to be deburred, an arm mounted on said base so as to be pivotable about an axis substantially parallel to the axis of rotation of said part, and a burr-removing knife rotatably carried by said arm, said knife being movable between an inoperative position remote from said part and an operative position closer to said part and engaging the side of said element, and means for rotating one of said part and said knife.

5. The gear deburring device of claim 4, in which said means rotates said part and is independent of said knife, said knife being adapted to be rotated by engagement with said element.

References Cited in the file of this patent

UNITED STATES PATENTS

| | | |
|---|---|---|
| 1,110,396 | Marks | Sept. 15, 1914 |
| 1,928,770 | Uhlmann et al. | Oct. 3, 1933 |
| 2,206,450 | Christman | July 2, 1940 |
| 2,278,300 | Barter et al. | Mar. 31, 1942 |
| 2,372,486 | Griffith | Mar. 27, 1945 |
| 2,430,375 | Upton | Nov. 4, 1947 |
| 2,787,195 | Topolinski | Apr. 2, 1957 |

FOREIGN PATENTS

| | | |
|---|---|---|
| 99,198 | Sweden | June 25, 1940 |
| 586,193 | Great Britain | Mar. 11, 1947 |
| 1,092,442 | France | Nov. 10, 1954 |